US012451809B2

(12) United States Patent
Massavie et al.

(10) Patent No.: US 12,451,809 B2
(45) Date of Patent: Oct. 21, 2025

(54) ELECTRICAL ENERGY CONVERTER AND ASSOCIATED SYSTEM FOR CONVERTING ELECTRICAL ENERGY

(71) Applicant: Commissariat à l'énergie atomique et aux énergies alternatives, Paris (FR)

(72) Inventors: Vincent Massavie, Grenoble (FR); Ghislain Despesse, Grenoble (FR); Sébastien Carcouet, Grenoble (FR); Xavier Maynard, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 368 days.

(21) Appl. No.: 18/309,134

(22) Filed: Apr. 28, 2023

(65) Prior Publication Data
US 2023/0361684 A1    Nov. 9, 2023

(30) Foreign Application Priority Data

May 3, 2022    (FR) ...................................... 22 04188

(51) Int. Cl.
*H02M 7/537* (2006.01)
*H02M 3/158* (2006.01)
(Continued)

(52) U.S. Cl.
CPC ............ *H02M 3/335* (2013.01); *H02M 3/158* (2013.01); *H02M 3/3376* (2013.01); *H02M 7/06* (2013.01); *H02M 7/537* (2013.01)

(58) Field of Classification Search
CPC ..... H02M 3/158; H02M 3/3376; H02M 7/537
See application file for complete search history.

(56) References Cited

U.S. PATENT DOCUMENTS

2013/0257558 A1\* 10/2013 Kim ...................... H01L 23/642
                                                                  333/32
2014/0002208 A1    1/2014 Kim et al.
(Continued)

OTHER PUBLICATIONS

French Preliminary Search Report issued Dec. 15, 2022, in French Application 22 04188 filed on May 3, 2022, 5 pages (with English Translation of Categories of Cited Documents).
(Continued)

*Primary Examiner* — Gary A Nash
(74) *Attorney, Agent, or Firm* — Oblon, McClelland, Maier & Neustadt, L.L.P.

(57) ABSTRACT

The invention relates to an electrical energy converter including an inverter (10) for obtaining alternative electrical energy from a DC electrical energy source. The inverter includes a switch (52) having first and second conduction terminals for receiving an AC voltage, the electrical energy converter being suitable for supplying an output electrical energy to a load (8). Said converter includes a capacitive circuit (14) with variable and controllable capacitance, connected between the inverter (10) and the load (8), the control of a modification of said capacitance making it possible to obtain a modification of an electrical output parameter of the converter. The associated system for converting electrical energy includes such an electrical energy converter and a control module (16) configured for receiving as input a setpoint value of said output electrical parameter ($V_{ref}$) of the converter and for controlling the variable capacitance of said capacitive circuit (14) as a function of said setpoint value.

10 Claims, 5 Drawing Sheets

(51) Int. Cl.
  *H02M 3/335* (2006.01)
  *H02M 3/337* (2006.01)
  *H02M 7/06* (2006.01)

(56) References Cited

U.S. PATENT DOCUMENTS

2015/0303806 A1* 10/2015 Madsen .............. H02M 3/1563
                                                    323/271
2016/0365795 A1* 12/2016 Madsen ............ H02M 3/33523
2022/0038030 A1    2/2022 Makhoul et al.

OTHER PUBLICATIONS

Gu et al., "A New Method to Regulate Resonant Converters" IEEE Transactions On Power Electronics, vol. 3, No. 4, 1988, pp. 430-439.

Harada et al., "Controlled Resonant Converters with Switching Frequency Fixed" Proceedings of the Annual Power Electronics Specialists Conference, 1987, pp. 431-438.

Moffatt et al., "A Distributed, Phase-locked, Class-E, RF Generator with Automatic Zero-Voltage Switching" IEEE Wireless Power Transfer Conference (WPTC), 2019, pp. 390-394.

Gu et al., "High-Frequency Resonant Converter with Synchronous Rectification for High Conversion Ratio and Variable Load Operation" The 2018 International Power Electronics Conference, 2018, pp. 632-638.

Garcia et al., "Class-E Rectifiers and Power Converters" IEEE Microwave Magazine, IEEE Service Center, Piscataway, NJ, US, vol. 19, No. 5, 2018, pp. 67-78.

* cited by examiner

ELECTRICAL ENERGY CONVERTER AND ASSOCIATED SYSTEM FOR CONVERTING ELECTRICAL ENERGY

This application claims priority to French Patent Application No. 22 04188 filed May 3 2022, the entire disclosure of which is incorporated by reference herein.

FIELD OF THE INVENTION

The present invention relates to an electrical energy converter and an associated system for converting electrical energy.

The invention belongs generally to the field of electrical devices, and more particularly electrical energy converters such as a power converter.

The invention applies more particularly to power converters suitable for working at high frequencies (2 MHz to 30 MHz) and very high frequencies (30 MHz to 300 MHz).

BACKGROUND OF THE INVENTION

In particular, electrical energy converters known as "Direct Current-Alternative Current" (DC-AC), also called inverters, suitable for working at high and very high frequencies (30 MHz to 300 MHz) are known.

Electrical energy converters known as "Direct Current-Direct Current" (DC-DC) are also known, e.g. integrating an inverter of the type described above and an Alternative Current-Direct Current (AC-DC) converter, also known as a rectifier.

More particularly, there are a plurality of classes of electrical energy converters including a switch, typically a transistor, including first and second conduction terminals intended for receiving an alternative voltage.

Such an electrical energy converter is intended for supplying a load with real or complex impedance. For the converter to work properly, it is necessary to switch off the transistor at zero voltage (in English, "zero voltage switch"), i.e. when the alternative voltage at the terminals of the transistor is substantially equal to zero. By substantially equal is meant herein to within 10%, preferentially to within 5%.

Conventionally, the components of the converter and the control duty cycle of the transistor are adjusted for closing the transistor at zero voltage, for a given load impedance. In such case, any modification of the impedance of the load, after adjustment, carries a risk of inducing a degraded efficiency of electrical energy conversion.

Patent application FR 2106069 filed on 9 Jun. 2021 proposes a power converter including a switching regulation unit for automatically regulating the control duty ratio of the transistor, and thus for automatically adapting to a modification of the load impedance while ensuring a switching at zero voltage.

However, the power converter described in patent application FR 2106069 is suitable for working for an output voltage amplitude and an output power which are substantially fixed.

More generally, known power converters are configured for working at fixed output voltage or power, for a load to be supplied with a variable or a fixed impedance.

The subject matter of the present invention is to overcome such drawback by proposing an electrical energy converter, an electrical output parameter of which, and in particular the amplitude of the output voltage, can be regulated within a regulation range.

SUMMARY OF THE INVENTION

To this end, the invention proposes, according to one aspect, an electrical energy converter including an inverter for obtaining an alternative electrical energy from a DC electrical energy source, said inverter including a switch including first and second conduction terminals intended for receiving an alternative voltage, the electrical energy converter being suitable for supplying an output electrical energy to a load having a load impedance. Such converter includes a capacitive circuit with variable and controllable capacitance, connected between the inverter and the load, the control of the modification of said capacitance making it possible to obtain a modification of an electrical output parameter of the converter.

Advantageously, the electrical energy converter according to the invention includes a capacitive circuit with variable, controllable capacitance, which can be used for regulating, upon control, the regulation of an electrical output parameter of the converter.

The electrical energy converter according to the invention can further have one or a plurality of the features below, taken independently or according to all technically feasible combinations.

The output parameter is an output voltage or current or power of the converter.

The converter includes an impedance matching unit configured for matching an output impedance of said inverter to the load impedance, said variable capacitance capacitive circuit being connected between the impedance matching unit and the load to be supplied.

The converter further includes a rectifier unit for obtaining a DC electrical power from an alternative electrical power source, said rectifier unit being connected between the capacitive circuit with variable capacitance and the load to be supplied.

The converter further includes a regulation unit configured for switching the switch when the voltage between said first and second conduction terminals of said switch is substantially zero.

The capacitive circuit includes a plurality of capacitors arranged in parallel, each capacitor being connected in series with an associated switch, said capacitor being connected to the capacitive circuit when the associated switch is in the closed position, said capacitor being disconnected from the capacitive circuit when the associated switch is in the open position, the variable capacitance of said capacitive circuit being equal, at a given instant, to the sum of the capacitances of the capacitors connected in the capacitive circuit at said given instant.

A first of said capacitors has an initial capacitance, the other capacitors each having a capacitance which is a multiple of said initial capacitance.

According to another aspect, the subject matter of the invention is a system for converting electrical energy including an electrical energy converter as briefly described hereinabove and an electronic module for controlling the capacitive circuit with variable capacitance, configured for receiving as input, a setpoint value of said electrical output parameter of the converter and for controlling the variable capacitance of said capacitive circuit as a function of said setpoint value.

According to a variant, the control module includes a subtractor, configured for receiving, on a first input, a value of said electrical output parameter of the converter, and for receiving, on a second input, the setpoint value of said electrical parameter, the subtractor being configured for calculating a difference between the value of the output electrical parameter of the converter and the setpoint value.

According to one variant, the control module further includes a conversion module configured for converting the computed difference into a control signal for the capacitive circuit.

BRIEF DESCRIPTION OF THE DRAWINGS

Other features and advantages of the invention will be clear from the description thereof which is given below as a non-limiting example, with reference to the enclosed figures, among which.

DETAILED DESCRIPTION OF EMBODIMENTS

Hereinafter in the description, the term "substantially equal to" defines a relation of equality within plus or minus 10%, preferentially within plus or minus 5%.

Figure 1:
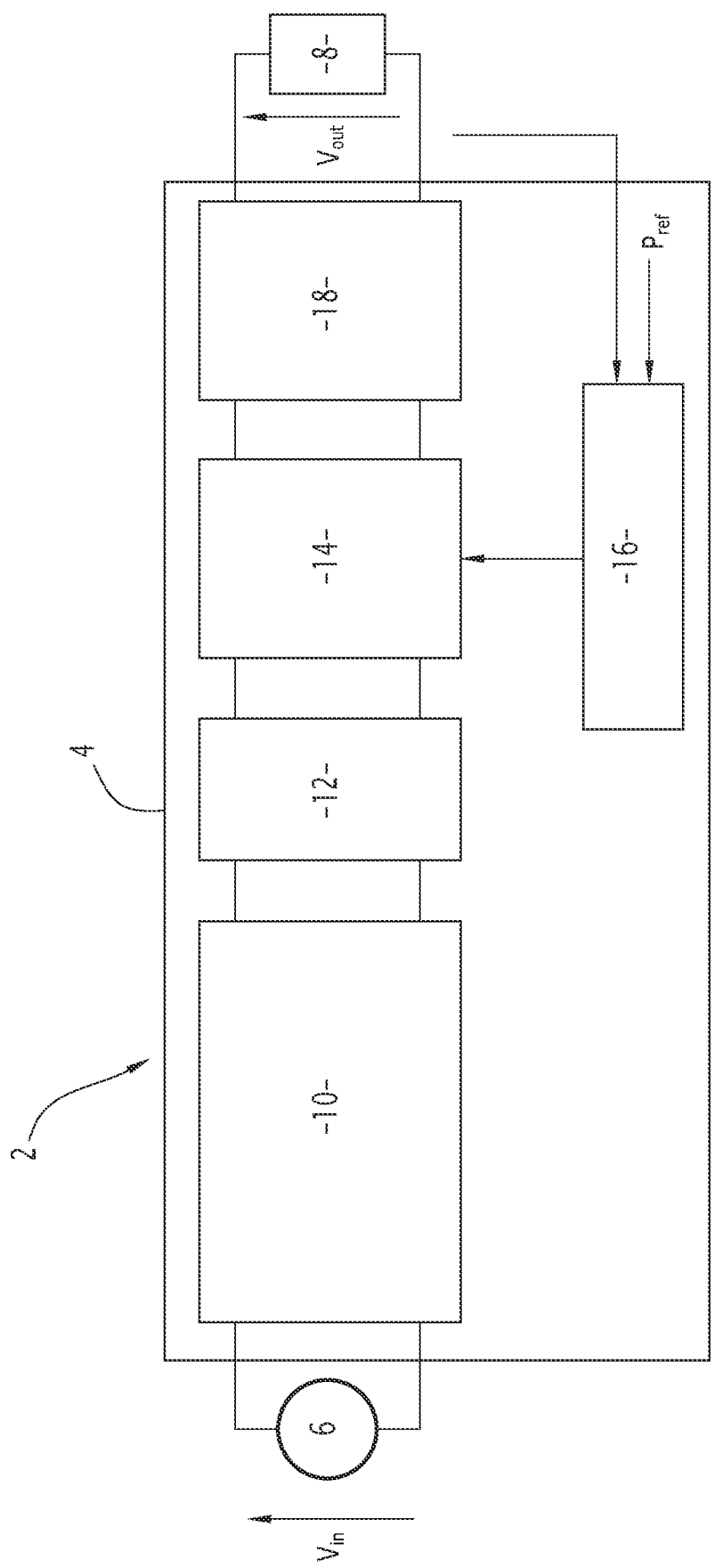
FIG. 1 is a schematic view of a system including an electrical energy converter according to a first embodiment.

FIG. 1 diagrammatically shows a system for converting electrical energy 2, including an electrical energy converter 4.

The electrical energy converter 4 is preferentially a DC-DC converter. In such case, the converter 4 includes a rectifier, as described in greater detail hereinafter.

The system 2 includes a source of electrical power 6, supplying a substantially DC voltage $V_{in}$. The power source 6 is e.g. a battery or a solar panel.

The electrical energy converter 4 is then configured for raising the value of the DC voltage between the input thereof and the output thereof and is then also called a step-up DC-DC converter; or is configured for lowering the value of the DC voltage between the input thereof and the output thereof and is then called a step-down DC-DC converter.

The electrical power converter 4 is configured for delivering N distinct output voltage(s) from E distinct input voltage(s), E and N each being an integer greater than or equal to 1.

In the examples shown in FIG. 1, the electrical energy converter 4 is configured for delivering an output voltage denoted by $V_{out}$, from an input voltage denoted by $V_{in}$, the number E of input voltage(s) and the number N of output voltage(s) being then each equal to 1.

The electrical energy converter 4 is connected to a load 8 with either a real or a complex load impedance.

In a variant (not shown), the electrical energy converter 4 is configured for delivering a plurality of distinct output voltages from one or a plurality of distinct input voltages, the number N of distinct output voltages being then greater than 1.

In a further variant, the electrical energy converter 4 is configured for delivering one or a plurality of distinct output voltages from a plurality of distinct input voltages, the number E of distinct input voltages then being greater than 1.

In a further variant, the electrical energy converter 4 is configured for delivering a plurality of distinct output voltages from a plurality of distinct input voltages, the numbers E and N being then each greater than 1.

When the electrical energy converter 4 is configured for delivering a plurality of distinct output voltages, the converter 4 is typically connected to a plurality of loads 8.

The electric power converter 4 includes a direct current-alternative current (DC/AC) converter unit 10, also known as an inverter.

The inverter 10 is preferentially a single-switch inverter, the switch being e.g. a transistor, suitable for working at high frequency (HF) and very high frequency (VHF), typically in a frequency range from 2 MHz to 300 MHz. In such case, the electric power converter 4 is a VHF converter.

The transistor is e.g. an insulated gate field effect transistor, also called MOSFET (Metal Oxide Semiconductor Field Effect Transistor). In a variant, the transistor is a bipolar transistor; an insulated gate bipolar transistor, also called IGBT (Insulated Gate Bipolar Transistor); a silicon (Si) transistor, a GaN (Gallium Nitride) transistor; a silicon carbide (SiC) transistor, a diamond transistor, or a thyristor.

The inverter 10 is e.g. of the type including a piezoelectric element.

More generally, the electrical energy converter 4 works in a similar way with a plurality of inverter topologies, e.g. Class E, Class Phi2, Class L-piezo inverters.

For example, class E is defined in the article by N. O. Sokal and A. D. Sokal, "Class E-A new class of high-efficiency tuned single-ended switching power amplifiers," published in *IEEE Journal of Solid-State circuits*, Vol. 10, no. 3, pp. 168-176, June 1975; the Phi2 class is defined in the article by J. M. Rivas, Y. Han, O. Leitermann, A. Sagneri and D. J. Perreault, "A High-Frequency Resonant Inverter Topology with Low Voltage stress," published in 2007 *IEEE Power Electronics Specialists Conference*, 2007, pp. 2705-2717; the L-piezo class is defined in the article by V. Massavie, G. Despesse, S. Carcouet and X. Maynard, "A new topology of resonant inverter including a piezoelectric component," published in 2021 *23rd European Conference on Power Electronics and Applications (EPE'21 ECCE Europe)*, 2021, pp. 1-10.

The electrical energy converter 4 further includes, in the embodiment illustrated, an impedance matching unit 12, which is configured for matching the impedance of the load 8 and the output impedance of the inverter 10.

For example, the impedance matching unit 12 is a circuit including real or complex passive components. A plurality of impedance matching circuit topologies are known, e.g. an L-shaped topology including inductive and capacitive components, arranged so as to achieve low-pass or high-pass filtering; a pi-shaped topology or a T-shaped topology.

Figure 3:
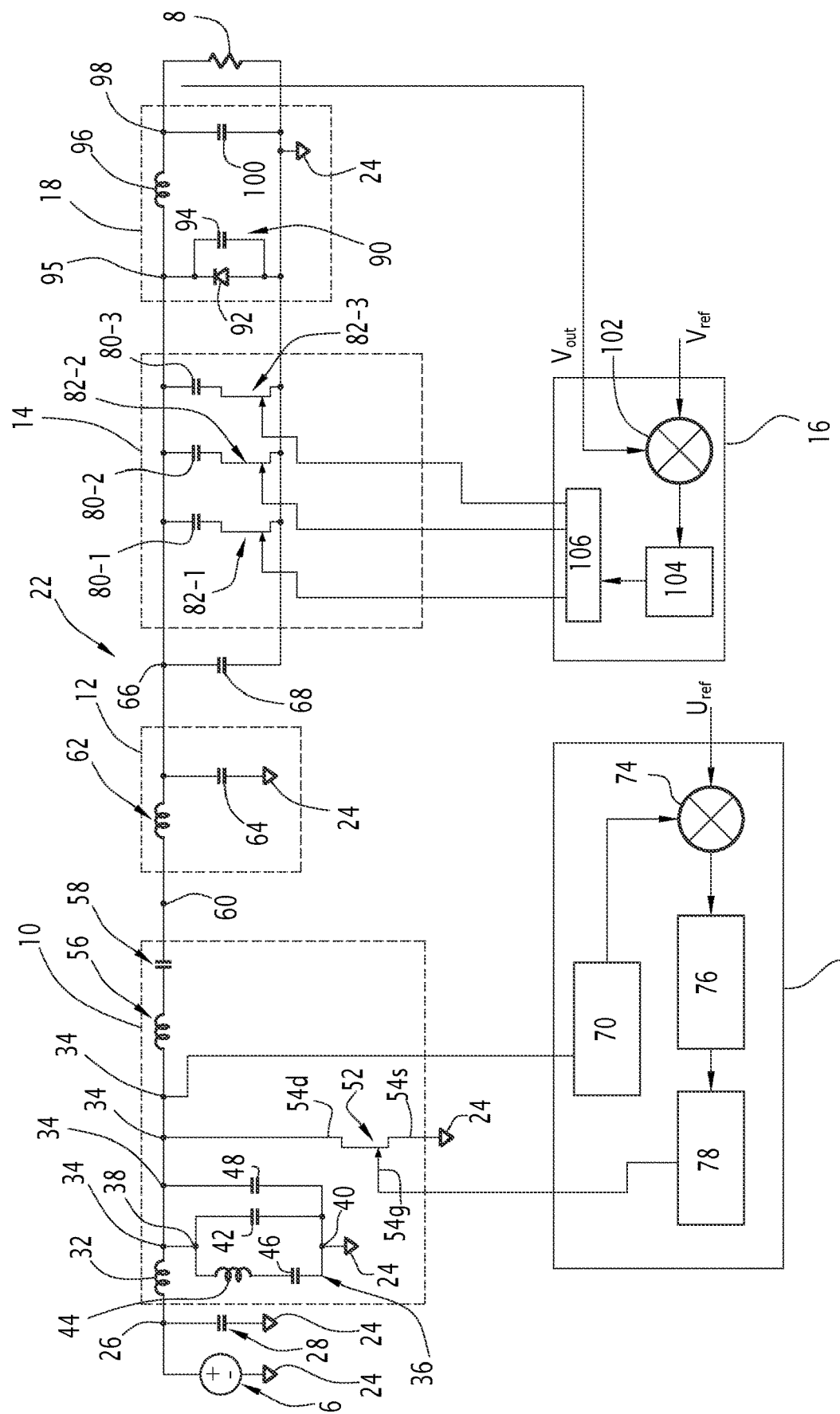
FIG. 3 schematically shows an embodiment of an electrical conversion system according to FIG. 2.

FIG. 3, described in greater detail hereinafter, illustrates a particular embodiment in which the impedance matching unit is formed by an inductive element, e.g. a coil, and a capacitor (LC circuit), with low-pass L-shaped topology.

Moreover, the electrical energy converter 4 includes a capacitive circuit 14 with variable capacitance, the variation in capacitance being controllable by a control module 16, advantageously used for varying an electrical output parameter of the electrical energy converter by varying the capacitance of the capacitive circuit 14. The electrical output parameter of the electrical energy converter 4 is e.g. a voltage, a current or a power.

The capacitive circuit 14 with variable capacitance is connected between the impedance matching unit 12 and the load 8.

When the electrical energy converter 4 is configured for delivering a plurality of distinct output voltages for supplying a plurality of loads 8, the converter 4 includes a capacitive circuit 14 with variable capacitance for each load 8.

In the embodiment illustrated, the capacitive circuit 14 is connected between the impedance matching unit 12 and a rectifier unit 18, being also a part of the electrical energy converter 4, in the case where the electrical energy converter 4 is a DC-DC converter.

The variation of the electrical output parameter is achieved by applying to the input of the control module 16 a setpoint value $P_{ref}$ of the electrical parameter value, e.g. a voltage setpoint value $V_{ref}$, or a current setpoint value $I_{ref}$, or a power setpoint value $P_{ref}$.

Figure 2:
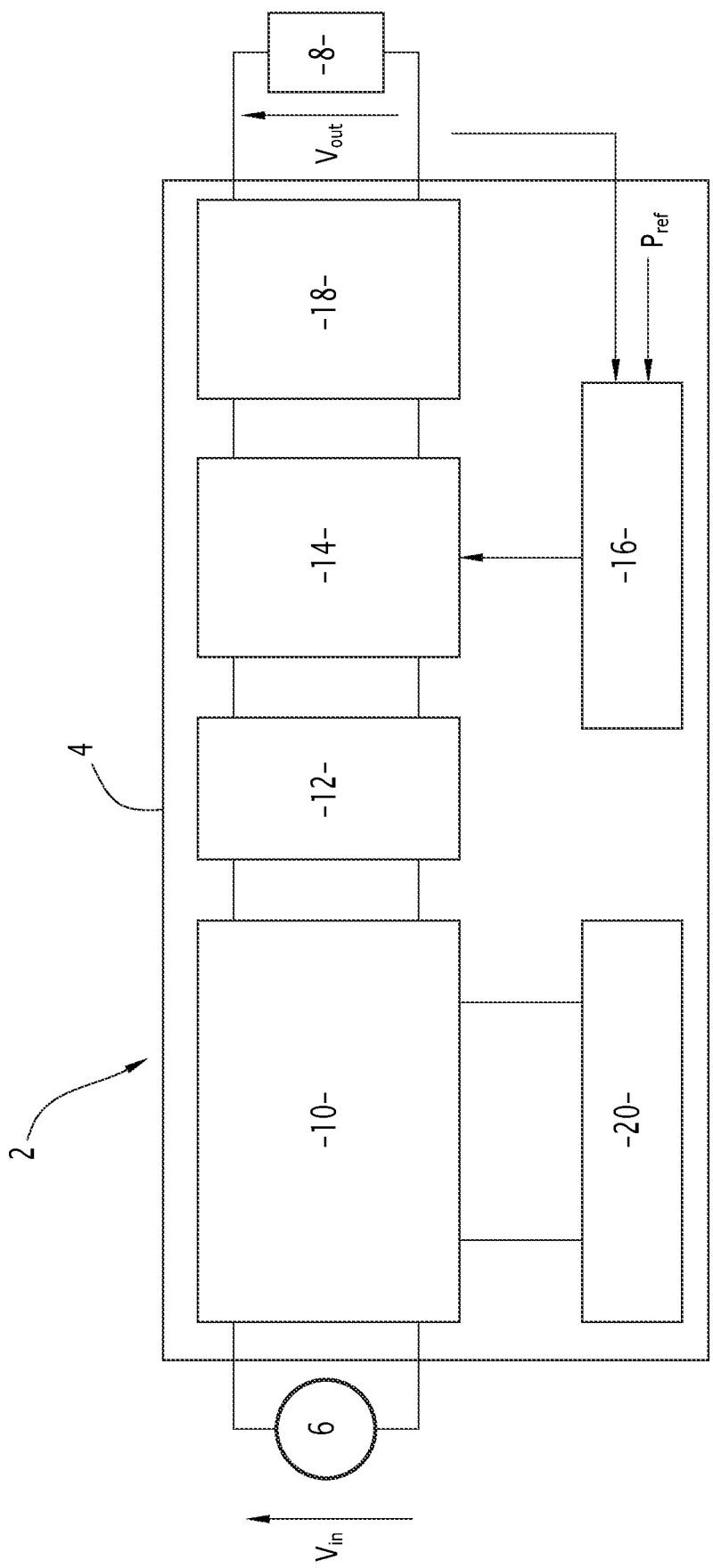
FIG. 2 is a schematic view of a system including an electrical energy converter according to a second embodiment.

In another embodiment, illustrated in FIG. 2, the system for converting electrical energy 2 includes a converter 4, which includes, in addition to the elements described hereinabove which are referenced by the same numbers, a regulation unit 20, which is configured for providing a switching at a substantially zero voltage ZVS (zero voltage switch) of the switch (e.g. transistor) of the inverter 10.

Indeed, advantageously, switching at substantially zero voltage leads to little disturbance of the inverter 10 and generates low energy losses at the inverter switch.

For example, in one embodiment, the regulation unit is of the type described in patent application FR2106069, configured for performing a switching at substantially zero voltage (ZVS).

FIG. 3 illustrates an example of a system for converting electrical energy 22, the elements of which are described in detail hereinafter.

In said particular example, the regulated output electrical parameter is the voltage.

The system for converting electrical energy 22 includes a source of electrical energy 6, supplying a substantially DC voltage $V_{in}$, including a negative terminal (denoted −) connected to a node 24. The node 24 is a node for applying a reference potential, e.g. the chassis ground. The power source 6 further includes a positive terminal (denoted +), connected to an input node 26 of the inverter 10.

The node 26 is also connected to one terminal of an optional capacitor 28 of given capacitance $C_{in}$, which smooths the input voltage, the other terminal of the capacitor 28 being connected to a node 24 for applying the reference potential.

The assembly formed by the source of energy referenced by 6 and the capacitor 28 forms, in the embodiment illustrated, a source of electrical energy.

In the embodiment illustrated in FIG. 3, the inverter 10 is an L-piezo inverter.

The inverter 10 includes an inductive element, e.g. a coil 32, one terminal of the coil 32 being connected to the input node 26 of the inverter, the other terminal being connected to a node 34.

The piezoelectric element 36 is connected between the node 34 and a node 24 for applying the reference potential.

In the embodiment illustrated, the piezoelectric element 36 is modeled in the form of two branches connected in parallel between two terminals (or electrodes) 38 and 40, the terminal 38 being connected to the node 34 and the terminal 40 being connected to the node 24, one of the branches including a capacitor 42, the other branch, called resonant branch, including an LC circuit formed by an inductive element, e.g. a coil 44, connected in series with a capacitor 46.

The term branch refers to a part of an electrical circuit located between two consecutive nodes, the elements of a branch being connected in series.

The capacitance of the capacitor 42 connected in parallel with the resonant branch is called parallel capacitance, or blocked capacitance, or reference capacitance, and denoted by $C_0$. The voltage across the piezoelectric element 36 then typically corresponds to the voltage across the capacitor 42.

The inverter 10 optionally includes a capacitor 48 of capacitance Cr, one terminal of the capacitor 48 being connected to the node 34, the other terminal of the capacitor 48 being connected to the node 24 for applying the reference potential. The capacitance Cr is a so-called adjustment capacitance.

The switch 52 is e.g. a field effect transistor (FET), e.g. a MOSFET (Metal Oxide Semiconductor Field effect Transistor).

In a variant, the transistor is a bipolar transistor; an insulated gate bipolar transistor (IGBT); a silicon (Si) transistor, a Gallium Nitride (GaN) transistor; a silicon carbide (SiC) transistor, a diamond transistor, or yet a thyristor.

According to another variant, the transistor is a high electron mobility transistor (HEMT) e.g. based on gallium nitride GaN.

The switch 52 includes a first conduction terminal 54*d* (drain), connected to the node 34, a second conduction terminal 54*s* (source) connected to the node 24 for applying the reference potential, and a third control terminal 54*g* (gate).

The effect of the control voltage Vgs is to control the switching of the switch 52 between a closed (or on) state and an open (or off) state. When the voltage Vgs is greater than or equal to a threshold voltage, the switch 52 is in the on-state, and when the voltage Vgs is less than the threshold voltage, the switch 52 is in the off-state.

As an example, the switch 52 of the inverter 10 has a switching frequency comprised between 2 MHz and 300 MHz.

The control voltage Vgs is supplied by the regulation unit 20, with the aim of ensuring a switching of the closing of the switch 52 when the voltage Vds between the first terminal 54*d* (the node 34, respectively) and the second terminal 54*s* of the switch is substantially zero.

The inverter 10 further includes another inductive element 56 e.g. a coil of inductance Ls, in series with a capacitor 58, of capacitance Cs, between the node 34 and an output terminal 60 of the inverter.

A sinusoidal voltage $V_{ch}$ is obtained at the output of the inverter 10.

The impedance matching unit 12 includes, in the embodiment of FIG. 3, an inductive element, e.g. a coil 62 of inductance $L_a$, connected between the output terminal 60 of the inverter and an output terminal 66 of the impedance matching unit, and a capacitor 64 of capacitance Ca, connected to the terminal 66 and the node 24 for applying the reference potential.

Thus, in said embodiment, the impedance matching unit has an L-shaped topology.

The electrical energy converter 22 further includes a regulation unit 20 which includes, in said embodiment, a unit 70 for detecting a minimum value of the voltage Vds and for averaging the voltage over a plurality of alternations, used for obtaining an average Vα. The unit 70 is connected between the node 34, connected to the terminal 54d of the switch 52, and an input of a subtractor 74.

The subtractor 74 includes a first input (+) connected to the unit 70 and a second input (−) receiving a reference potential $U_{ref}$. The subtractor 74 makes a difference between the first and the second input.

Thus, the subtractor 74 compares the mean voltage Vα with the reference potential $U_{ref}$, the reference potential being adjusted so as to obtain a quasi-ZVS operation.

An image signal of a difference between Vα and $U_{ref}$ is supplied at the output of the subtractor.

The output of the subtractor 74 is connected to the input of a corrector 76, the corrector 76 being, in one embodiment, an integral proportional corrector. The corrector 76 is used for obtaining a regulation loop which is more stable than if the circuit 20 had no corrector.

The output of the corrector 76 is supplied at the input of a pulse width modulation (PWM) circuit 78, which is connected to the gate of the transistor 52 so as to supply the voltage control signal Vgs, which controls the switching of the transistor 52. Thus, the instants of turning-on and turning-off the transistor 52 are controlled by the signal coming from the PWM circuit 78 which is controlled by the corrector 76 which supplies a DC voltage image of a duty cycle to be applied. Such signal is commonly referred to as a "duty cycle".

In the embodiment shown in FIG. 3, the converter 22 further includes, at the output of the impedance matching unit 12, a capacitor 68 connected between the output terminal 66 and the node 24 for applying the reference potential, of predetermined capacitance (fixed capacitance), as well as a capacitive circuit 14 with variable capacitance, controlled by a control module 16.

In the embodiment shown in FIG. 3, the capacitive circuit 14 includes P=3 capacitive components, e.g. capacitors 80-1, 80-2 and 80-3 connected in parallel, with respective capacitances Cvar_1, Cvar_2, Cvar_3.

The number P of capacitors in the capacitive circuit is a chosen integer.

Each of the capacitors is connected to an associated switch 82-1, 82-2, 82-3, e.g. a transistor.

More generally, 80-i refers to any of the capacitors of the capacitive circuit, and 82-i refers to the associated switch.

It is to be noted that a capacitor 80-i may consist of any association, in series and/or in parallel, of elementary capacitors. The above can be useful for obtaining accurate capacitance ratios between 2 capacitances 80-i. E.g., to obtain a capacitance 80-3 equal to 2 times the capacitance 80-2 which is equal to twice the capacitance 80-1, it is possible to use the same capacitance reference and to use 2 in parallel for 80-3, only one for 80-2 and two in series for 80-1. Thus, using the same reference, the characteristics and temperature drifts will be similar.

The variable capacitance Cvar of the capacitive circuit 14 is, at a given instant, equal to the sum of the capacitances of the capacitors connected in the capacitive circuit 14.

A capacitor 80-i is connected in the capacitive circuit 14 when the switch 82-i to which same is connected, also called associated switch, is closed, which lets the electric current flow. When the associated switch is open, the capacitor 80-i is disconnected, and the capacitance Cvar_i thereof does not contribute to the total capacitance of the capacitive circuit.

Thus, by controlling the opening and the closing of the switches associated with the capacitors, and consequently by connecting and disconnecting the associated capacitors in the capacitive circuit, it is possible to vary the capacitance Cvar of the capacitive circuit.

In the illustrated embodiment, it is possible to connect/disconnect each capacitor individually, by applying a control signal to the gate of the associated transistor. Thus, all the combinations of opening/closing of the transistors are conceivable, which can be used for reaching a set of capacitance values Cvar.

For example, when the capacitive circuit includes 3 capacitors, 8 combinations are conceivable.

In one embodiment, the capacitors 80-1 to 80-P (where P=3 in the example shown in FIG. 3) have different capacitance values, e.g. increasing and according to a geometric progression (or geometric sequence) of the ratio R, e.g. R=2.

As an example, but not limited to, Cvar_1=C, Cvar_2=2C, Cvar_3=4C, and more generally Cvar_p=$2^{p-1}$C. E.g., the capacitance value C, called initial capacitance, is equal to 120 pF.

In the case where the capacitive circuit includes P capacitors in parallel, with capacitances of increasing values with values C, 2C, 4C, . . . , $2^{P-1}$C, the control of the associated switches can be used for obtaining total capacitance values Cvar (variable capacitance of the capacitive circuit) ranging from 0 to Cvar_max=$(2^P-1)$C.

In such case, the number of steps of capacitance values is $2^P$.

Thereby, the total capacitance Cvar is written mathematically in the form:

$$Cvar = \sum_{i=1}^{P} K_i Cvar\_i$$

Where $K_i$ represents the state of the switch associated with the capacitor of capacitance Cvar_i, $K_i=0$ if the switch is open, and $K_i=1$ if the switch is closed.

As indicated hereinabove, in one embodiment, the switches 82-1 to 82-P are transistors.

E.g., each switch 82-i is a field effect transistor (FET), e.g. a MOSFET (Metal Oxide Semiconductor Field Effect Transistor).

In a variant, the transistor is a bipolar transistor; an insulated gate bipolar transistor (IGBT), a silicon (Si) transistor, a gallium nitride (GaN) transistor; a silicon carbide (SiC) transistor, a diamond transistor, or a thyristor.

According to another variant, the transistor is a high electron mobility transistor (HEMT) e.g. based on gallium nitride GaN.

Each transistor 82-i includes a first conduction terminal 84d-i (drain) connected to a node 86-i, a second conduction terminal 84s-i (source) connected to the node 24 for applying the reference potential, and a third control terminal 84g-i (gate).

The control voltage Vgs-i (gate source voltage between the third terminal and the second terminal) has the effect of controlling the switching of the transistor 82-i between an on-state and an off-state. When the voltage Vgs-i is greater than or equal to a threshold voltage of the transistor, the transistor 82-i is in the on-state, and when the voltage Vgs-i is less than the threshold voltage, the transistor 82-i is in the off-state.

Two embodiments of the control module 16 for controlling the respective switching control voltages of the transistors 82-1 to 82-P will be described hereinafter.

In the embodiment shown in FIG. 3, the converter 22 further includes a class E rectifier 18 the function of which is to rectify the sinusoidal voltage supplied by the inverter 10 in order to obtain a DC output voltage.

In said embodiment, the rectifier unit 18 includes a unit 90 including a diode 92 connected in parallel with a capacitor 94, the unit 90 being connected between an input node 95 of the rectifier and the node 24 for applying the reference potential, an inductive element, e.g. a coil 96 connected between the node 95 and an output node 98 of the rectifier 18, and a capacitor 100, which is an output capacitor of capacitance $C_{out}$ connected between the node 98 and the node 24 for applying the reference potential.

The output voltage is supplied to a load 8.

An image of the output voltage $V_{out}$ is supplied at the input of the control module 16 of the capacitive circuit with variable capacitance.

In one embodiment, the module 16 includes a subtractor 102 which includes a first input (+) on which the output voltage $V_{out}$ is received and a second input (−) on which a reference voltage $V_{ref}$ is supplied.

In other embodiments, another electrical parameter is regulated at the output, and a setpoint value of the regulated electrical parameter is provided.

The regulated electrical parameter is e.g. the current, and an output current value is supplied to the first input of the subtractor 102, and a setpoint value for the current is supplied to the second input of the subtractor 102.

According to a variant, the regulated parameter is the power, an output voltage value and an output current value are obtained and multiplied so as to obtain an output power value supplied to the first input of the subtractor 102, and a reference power value $P_{ref}$ is supplied to the second input of the subtractor 102.

In the embodiment shown in FIG. 3, the subtracter 102 supplies at the output, an image of a difference between the voltage $V_{out}$ and the reference voltage $V_{ref}$ which is supplied at the input of a proportional, integral (PI) or proportional, integral, derivative (PID) corrector 104, or another type of corrector which delivers a control signal.

The signal is then supplied to an analog-to-digital converter 106 which converts the control signal into a digital signal the bits of which address each switch 82-*i*.

For example, in one embodiment, the corrector 104 supplies a DC voltage image of the difference between the voltage $V_{out}$ and the voltage $V_{ref}$. The DC voltage value is converted into a digital value by the converter 106, e.g. coded over 3 bits. Each bit controls one of the switches 82-1, 82-2, 82-3, the least significant bit controlling the switch connected to the lowest capacitance, and so on.

Figure 4:
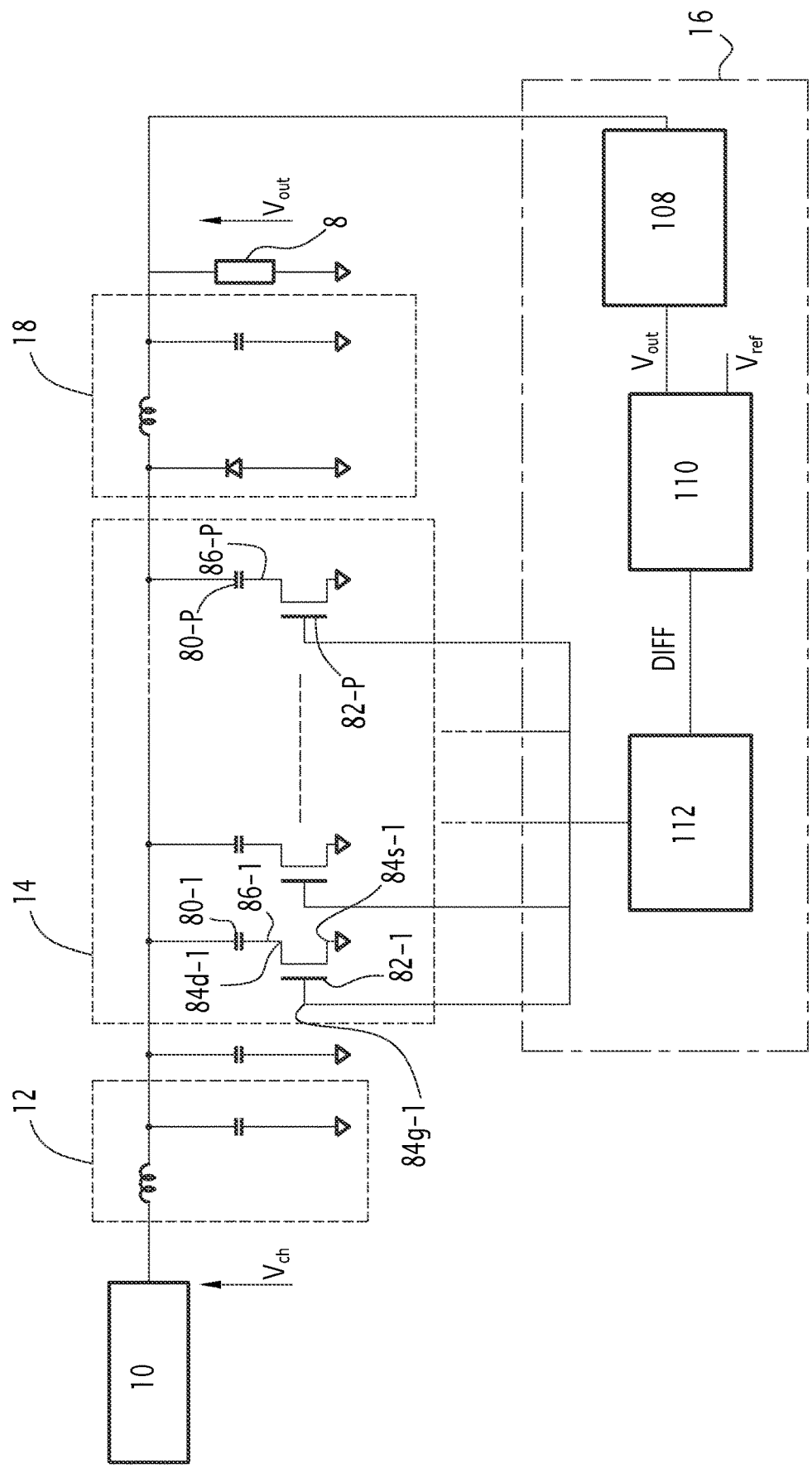
FIG. 4 shows, schematically and partially, a second embodiment of a control module of an electrical energy converter.

FIG. 4 is a partial, schematic representation of another embodiment of the invention. The inverter 10 is not shown, and the impedance matching unit has an architecture similar to the architecture described with reference to FIG. 3. The rectifier unit 18 is simplified with respect to same described with reference to FIG. 3.

In such embodiment, the capacitive circuit 14 includes P capacitors, and associated switches 82-1 to 82-P.

In said embodiment, the control module 16 is a digital-control electronic module, e.g. a microcontroller, including an analogue-to-digital converter 108 which receives at the input thereof the output voltage $V_{out}$, which same converts into a digital value.

The digital-control electronic module is either integrated into the electrical energy converter or external to the electrical energy converter.

The digital-control electronic module 16 further includes a subtractor module 110, which performs a subtraction between the digitized voltage value and the voltage setpoint value $V_{ref}$.

The difference DIFF between the two values is supplied at the input of a corrector 112, e.g. a PID corrector, which supplies at the output, the control voltage values of each of the switches 82-1 to 82-P.

Since the value given by the module 112 is a digital value, which is coded over P bits, each bit controls one of the switches, the least significant bit controlling the switch connected to the lowest value capacitor, and so on.

Alternatively, another output electrical parameter, e.g. the output current or the output power, and a setpoint value of said electrical parameter, are supplied to the digital-control electronic module.

Figure 5:
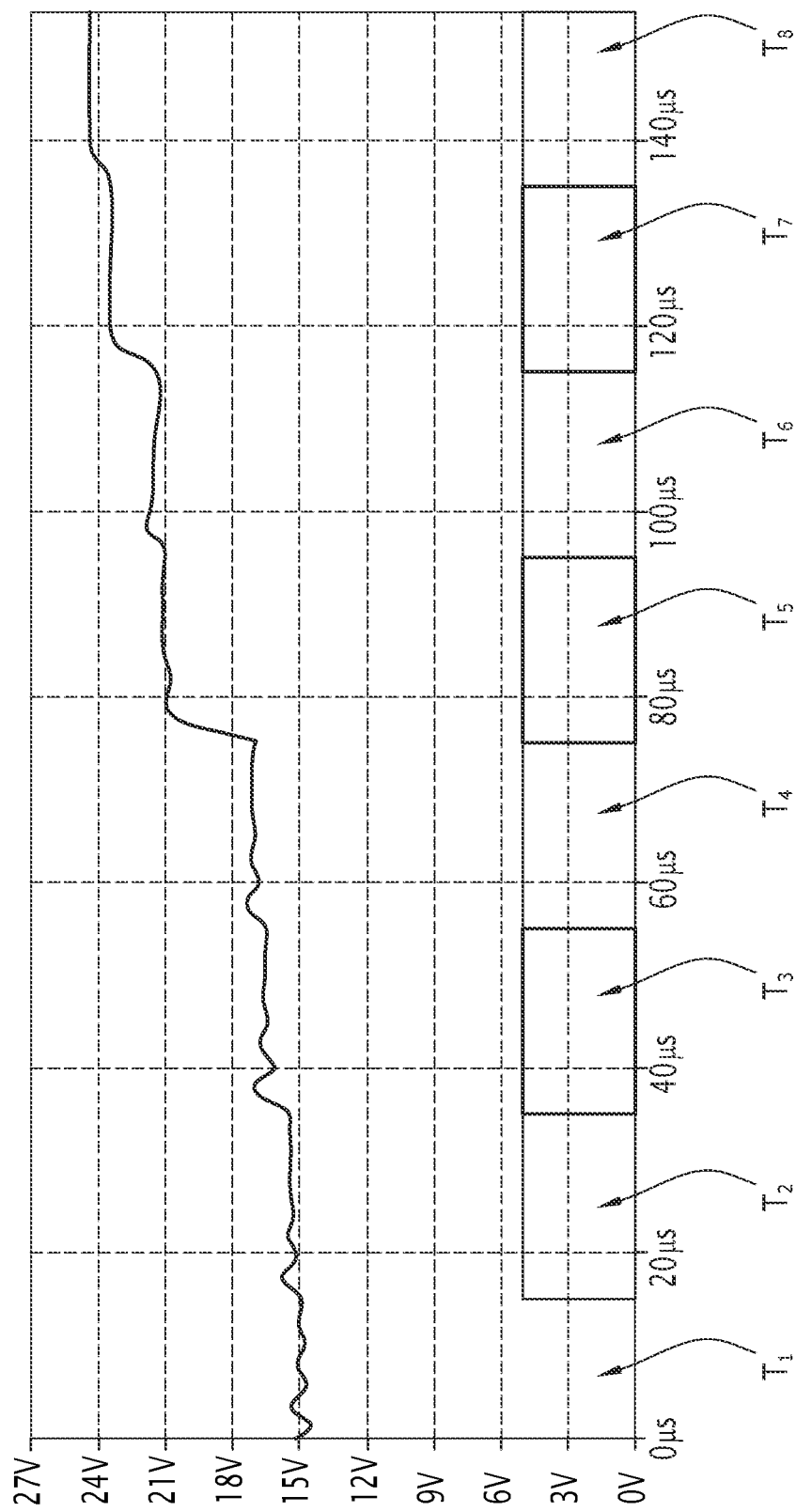
FIG. 5 is a graph representing an example of the change of the output voltage of an electrical energy converter including a capacitive circuit according to the invention.

FIG. 5 is a graph illustrating the output voltage $V_{out}$ as a function of time, obtained as a function of the connections/disconnections of the capacitors of the capacitive circuit shown in FIG. 3, via the closing/opening of the associated switches.

The graph shown in FIG. 5 is obtained by simulating connection/disconnection over time, as indicated above the x-axis.

During a first period T1, the switches are open.

During a second period T2, the first capacitor of capacitance Cvar_1 is connected in the capacitive circuit, the capacitance of the capacitive circuit being equal to Cvar_1.

During a third period T3, the first capacitor of capacitance Cvar_1 is disconnected and the second capacitor of capacitance Cvar_2 is connected in the capacitive circuit, the capacitance of the capacitive circuit being equal to Cvar_2.

During a fourth period T4, the first capacitor of capacitance Cvar_1 and the second capacitor of capacitance Cvar_2 are connected in the capacitive circuit, the capacitance of the capacitive circuit being equal to Cvar_1+Cvar_2.

During a fifth period T5, the first capacitor of capacitance Cvar_1 and the second capacitor of capacitance Cvar_2 are disconnected and the third capacitor of capacitance Cvar_3 is connected in the capacitive circuit, the capacitance of the capacitive circuit being equal to Cvar_3.

During a sixth period T6, the first capacitor of capacitance Cvar_1 and the third capacitor of capacitance Cvar_3 are connected in the capacitive circuit, the second capacitor of capacitance Cvar_2 being disconnected, the capacitance of the capacitive circuit is equal to Cvar_1+Cvar_3.

During a seventh period T7, the first capacitor of capacitance Cvar_1 is disconnected and the second capacitor of capacitance Cvar_2 and the third capacitor of capacitance Cvar_3 are connected in the capacitive circuit, the capacitance of the capacitive circuit being equal to Cvar_2+Cvar_3.

During an eighth period T8, the first, the second and the third capacitors are connected, the total capacitance being equal to Cvar_1+Cvar_2+Cvar_3.

The eight successive periods correspond to steps of increasing output voltage values, ranging in the present example from 14.9 V to 25.7 V, i.e. a variation of 10.8 V.

In such example, the initial capacitance Cvar_1=C=120 pF, Cvar_2=2C=240 pF and Cvar_3=4C=480 pF.

The successive steps correspond to variable capacitance values Cvar ranging from 0 pF for the first period T1 to 840 pF during the eighth period T8, in increments of 120 pF per period, i.e. 120 pF for the second period, 240 pF for the third period etc.

Such embodiment of the invention is particularly advantageous, since the number of capacitors can be modulated and can be used for obtaining a variation by steps which can also be modulated.

Advantageously, to obtain a fine granularity in the variation of the output voltage values, the capacitance value C (initial capacitance) is a small value, e.g. on the order of 5 pF to 120 pF.

Thus, in the embodiment described, the variable capacitances of the capacitors of the capacitive circuit are: 0, C, 2C, 4C, 8C, ... $2^{P-1}C$, which can be used for obtaining values of Cvar ranging from 0 to Cvar_max=$(2^P-1)C$ in increments of C.

For example, in an application case, a specification defining a regulation range of the output voltage, between a minimum voltage and a maximum voltage.

The minimum voltage is used for computing the capacitance of the capacitor 68, and the maximum voltage indicates the capacitance Cvar_max, equal to the sum of all the capacitances of the capacitors of the capacitive circuit. In this way it is possible to choose the initial capacitance C and/or the number of capacitors.

The invention has been described hereinabove in an embodiment in which the capacitive circuit with variable capacitance is made by the parallel connection of a plurality of capacitors.

In variants, the capacitive circuit includes other types of capacitive components with controllable variable capacitance. E.g., the capacitive circuit includes a variable capacitor (or varicap) with a capacitance ranging from 100 pF to 200 pF, which allows for a continuous variation of the output voltage, and more generally of the chosen output electrical parameter, over the achievable regulation range depending on the capacitance variation range.

According to another embodiment, the capacitive circuit includes one or a plurality of adjustable MEMS (Micro Electro Mechanical System) capacitors.

The converter of the embodiment described in detail includes an L-piezo inverter and a class E rectifier.

Nevertheless, it is clear for a person skilled in the art that the invention applies with other inverter topologies, e.g. class E inverters, class Phi2 inverters.

Similarly, the invention applies with other rectifier topologies, e.g. class DE rectifiers.

According to another alternative, the invention also applies in DC-AC converters, for supplying an alternative load without rectification. In such case, the regulated electrical parameter is the amplitude of the output voltage, or the output current or power of the converter.

Advantageously, the invention finds application in many applications requiring a regulated output voltage, or a regulated output current or a regulated output power.

For example, the invention finds application in systems for supplying electrical power to electronic circuits, from a battery or a power bus.

The invention claimed is:

1. An electric power converter including an inverter for obtaining an alternative electrical energy from a source of DC electric power, said inverter comprising a switch including first and second conduction terminals for receiving an alternative voltage, said electrical energy converter being suitable for supplying an output electrical energy to a load having a load impedance, said converter comprising a capacitive circuit with variable and controllable capacitance, connected between the inverter and the load, the control of a change in said capacitance being used for obtaining a change in an output electrical parameter of the converter.

2. The converter according to claim 1, wherein said output parameter is an output voltage or current or power of the converter.

3. The converter according to claim 1, comprising an impedance matching unit configured for matching an output impedance of said inverter with the load impedance, said capacitive circuit with variable capacitance being connected between the impedance matching unit and the load to be supplied.

4. The converter according to claim 3, further comprising a rectifier unit for obtaining a DC electrical energy from a source of AC electrical energy, said rectifier unit being connected between the capacitive circuit with variable capacitance and the load to be supplied.

5. The converter according to claim 1, further comprising a regulator unit configured for switching the switch when the voltage between said first and second conduction terminals of said switch is substantially zero.

6. The converter according to claim 1, wherein the capacitive circuit comprises a plurality of capacitors arranged in parallel, each capacitor being connected in series with an associated switch, said capacitor being connected in the capacitive circuit when the associated switch is in the closed position, said capacitor being disconnected from the capacitive circuit when the associated switch is in the open position, the variable capacitance of said capacitive circuit being equal, at a given instant, to the sum of the capacitances of the capacitors connected in the capacitive circuit at said given instant.

7. The converter according to claim 6, wherein one of said capacitors has an initial capacitance, the other capacitors each having a capacitance which is a multiple of said initial capacitance.

8. A system for converting electrical energy including an electrical energy converter according to claim 1 and a control module configured for receiving as input, a setpoint value of said output electrical parameter of the converter and for controlling the variable capacitance of said capacitive circuit as a function of said setpoint value.

9. The system for converting electrical energy according to claim 8 wherein said control module comprises a subtractor configured for receiving, at a first input, a value of said output electrical parameter of the converter and for receiving, at a second input, the setpoint value of said electrical parameter, said subtractor being configured for computing a difference between the value of the output electrical parameter of the converter and the setpoint value.

10. The system for converting electrical energy according to claim 9, wherein said control module further comprises a conversion module configured for converting the calculated difference into a control signal of the capacitive circuit.

* * * * *